(12) United States Patent
Nádas et al.

(10) Patent No.: US 11,038,994 B2
(45) Date of Patent: Jun. 15, 2021

(54) TECHNIQUE FOR TRANSPORT PROTOCOL SELECTION AND SETUP OF A CONNECTION BETWEEN A CLIENT AND A SERVER

(71) Applicant: Telefonaktiebolaget LM Ericsson (publ), Stockholm (SE)

(72) Inventors: Szilveszter Nádas, Budapest (HU); Attila Mihály, Dunakeszi (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 175 days.

(21) Appl. No.: 16/076,113

(22) PCT Filed: Feb. 10, 2016

(86) PCT No.: PCT/EP2016/052808
§ 371 (c)(1),
(2) Date: Aug. 7, 2018

(87) PCT Pub. No.: WO2017/137076
PCT Pub. Date: Aug. 17, 2017

(65) Prior Publication Data
US 2020/0153945 A1  May 14, 2020

(51) Int. Cl.
*H04L 29/06* (2006.01)
*H04L 29/08* (2006.01)

(52) U.S. Cl.
CPC ............ *H04L 69/24* (2013.01); *H04L 67/141* (2013.01); *H04L 69/18* (2013.01); *H04L 69/22* (2013.01)

(58) Field of Classification Search
CPC ...... H04L 67/14; H04L 67/141; H04L 67/146; H04L 67/147; H04L 67/28;
(Continued)

(56) References Cited

U.S. PATENT DOCUMENTS 6,665,725 B1 * 12/2003 Dietz ...................... H04L 69/16
  709/230
6,671,367 B1   12/2003 Graf et al.
(Continued)

OTHER PUBLICATIONS

Brian Trammell, Mirja Kuhlewind, and Elio Gubser, Joe Hildebrand ('New Transport Encapsulation for Middlebox Cooperation', 2015 IEEE Conference on Standards for Communications and Networking (CSCN), pp. 187-192) (Year: 2015).*
(Continued)

*Primary Examiner* — Greg C Bengzon
(74) *Attorney, Agent, or Firm* — Coats + Bennett, PLLC (57) ABSTRACT

A technique for Transport Protocol, TP, selection and setup of a connection between a client and a server is disclosed. An exemplary method aspect (in the client), comprises the steps of preparing a session setup message comprising: i) setup information for at least one candidate TP, and ii) a preference order for setup of the at least one TP; transmitting the prepared session setup message towards the server; and receiving, in response to the transmitted session setup message, a setup response message comprising setup information pertaining exclusively to one TP selected for the connection. A further method aspect (in the server) comprises the steps of receiving the session setup message; selecting, depending on availability of the candidate TPs, the most preferred TP on the basis of the preference order; and transmitting, in response to the received session setup message, the setup response message.

7 Claims, 10 Drawing Sheets

(58) Field of Classification Search
CPC ............ H04L 67/2804; H04L 67/2819; H04L 67/2838; H04L 67/2842; H04L 67/2847; H04L 67/2852; H04L 69/18; H04L 69/22; H04L 69/26; H04L 65/1065; H04L 65/1069; H04L 65/1006; H04L 67/02; H04L 65/1016; H04L 65/105; H04L 65/4061; H04L 65/80; H04L 12/1489; H04L 2209/24; H04L 41/5019; H04L 41/5022; H04L 41/5025; H04L 41/5029; H04L 41/5051; H04L 41/5054; H04L 51/5058; H04L 47/11; H04L 47/24; H04L 47/2425; H04L 47/39; H04L 47/801; H04L 47/803; H04L 47/825; H04L 51/38; H04L 61/1529; H04L 61/2564; H04L 61/2575; H04L 61/2589; H04L 63/0428; H04L 63/061; H04L 65/1003; H04L 65/1009; H04L 65/103; H04L 65/1046; H04L 65/1063; H04L 65/602; H04L 65/608; H04L 67/10; H04L 67/2828; H04L 69/04; H04L 69/161; H04L 9/0819; H04L 12/2809; H04L 12/283; H04L 12/2832; H04L 47/35; H04L 63/0457; H04L 65/1073; H04L 65/1083; H04L 67/125; H04L 67/30; H04L 67/306; H04L 67/322; G06F 2209/5015; G06F 9/5027; G06F 9/5077; H04M 3/42042; H04M 3/5183; H04M 3/5191; H04M 7/0024; H04M 7/0027; H04M 7/0072; H04W 4/10; H04W 76/10; H04W 80/10; H04W 4/70; H04W 88/06

See application file for complete search history.

(56) References Cited

U.S. PATENT DOCUMENTS

| | | | | |
|---|---|---|---|---|
| 7,613,613 | B2* | 11/2009 | Fields | 704/272 |
| 7,953,867 | B1 | 5/2011 | Andreasen | |
| 8,447,829 | B1* | 5/2013 | Geller | G06F 9/468 |
| | | | | 709/217 |
| 9,282,130 | B1* | 3/2016 | Goepp | H04L 12/1818 |
| 9,699,490 | B1* | 7/2017 | Japp | H04N 21/251 |
| 10,171,511 | B2* | 1/2019 | Moore | H04L 65/1069 |
| 10,296,392 | B2* | 5/2019 | Heil | G06F 9/5027 |
| 2002/0112054 | A1* | 8/2002 | Hatanaka | H04L 29/06 |
| | | | | 709/225 |
| 2005/0091362 | A1* | 4/2005 | Shigeta | H04L 67/2823 |
| | | | | 709/223 |
| 2005/0141560 | A1* | 6/2005 | Muthiah | H04L 47/10 |
| | | | | 370/474 |
| 2008/0208959 | A1* | 8/2008 | St. John | H04L 67/02 |
| | | | | 709/203 |
| 2009/0125476 | A1* | 5/2009 | Jager | G06F 3/0482 |
| 2009/0125517 | A1* | 5/2009 | Krishnaswamy | H04L 67/04 |
| 2011/0153765 | A1* | 6/2011 | Kowalewski | H04L 12/1813 |
| | | | | 709/206 |
| 2011/0249658 | A1* | 10/2011 | Wohlert | H04L 65/1016 |
| | | | | 370/338 |
| 2014/0098756 | A1* | 4/2014 | Tabatabaei Yazdi | |
| | | | | H04W 76/10 |
| | | | | 370/329 |
| 2014/0108668 | A1* | 4/2014 | Zhang | H04W 76/10 |
| | | | | 709/228 |
| 2014/0181311 | A1* | 6/2014 | Hussein | H04L 67/141 |
| | | | | 709/227 |
| 2014/0254434 | A1* | 9/2014 | Jain | H04L 67/306 |
| | | | | 370/259 |
| 2014/0280995 | A1* | 9/2014 | Ezell | H04L 65/1016 |
| | | | | 709/229 |
| 2015/0002614 | A1* | 1/2015 | Zino | H04N 7/148 |
| | | | | 348/14.08 |
| 2015/0032804 | A1* | 1/2015 | Fablet | H04L 67/26 |
| | | | | 709/203 |
| 2015/0082021 | A1* | 3/2015 | Mandyam | G06F 9/541 |
| | | | | 713/151 |
| 2015/0095503 | A1* | 4/2015 | Lim | H04L 67/02 |
| | | | | 709/227 |
| 2015/0358263 | A1* | 12/2015 | Bertin | G06F 9/54 |
| | | | | 709/206 |
| 2015/0373056 | A1* | 12/2015 | Bouthemy | H04L 65/1006 |
| | | | | 709/203 |
| 2016/0119477 | A1* | 4/2016 | Sharpe | H04W 4/21 |
| | | | | 379/265.09 |
| 2016/0127199 | A1* | 5/2016 | Ding | H04L 41/5051 |
| | | | | 709/226 |
| 2016/0164942 | A1* | 6/2016 | Reddappagari | H04L 65/1069 |
| | | | | 348/14.13 |
| 2016/0165015 | A1* | 6/2016 | Reddappagari | H04L 65/1069 |
| | | | | 370/392 |
| 2016/0165058 | A1* | 6/2016 | Vander Mey | H04L 69/24 |
| | | | | 370/259 |
| 2016/0165060 | A1* | 6/2016 | Li | H04M 7/0072 |
| | | | | 370/259 |
| 2016/0286003 | A1* | 9/2016 | Pessis | H04L 67/42 |
| 2016/0337410 | A1* | 11/2016 | Hancock | H04L 65/1069 |
| 2017/0163607 | A1* | 6/2017 | Skuratovich | H04L 63/0428 |
| 2017/0163694 | A1* | 6/2017 | Skuratovich | H04L 65/602 |
| 2017/0223128 | A1* | 8/2017 | Shuvaev | H04L 12/2832 |
| 2017/0295475 | A1* | 10/2017 | Patel | H04W 4/10 |
| 2018/0109503 | A1* | 4/2018 | Nadas | H04L 63/0457 |
| 2018/0159901 | A1* | 6/2018 | Chatras | H04L 65/608 |
| 2018/0183688 | A1* | 6/2018 | Mihaly | H04L 41/5019 |

OTHER PUBLICATIONS

Humberto J. La Roche, "Use Cases for Communicating End-Pointsin Mobile Network Middleboxes", Position Paper for IAB MaRNEW Workshop (2015) Sep. 2015 (Year: 2015).*

Joe Hildebrand, "Substrate Protocol for User Datagrams (SPUD) Prototype", Mar. 25, 2015 (Year: 2015) (Year: 2015).*

Brian Trammell, Joe Hildebrand, "Evolving Transport in the Internet", www.computer.org/internet/. Published by the IEEE Computer Society, Sep./Oct. 2014.*

Mihaly, A, et al., "Enablers for Transport Layer Protocol Evolution," Internet Engineering Task Force, Internet-Draft, Mar. 9, 2015, Internet Society (ISOC) 4, Rue Des Falaises CH-1205 Geneva, Switzerland, pp. 1-16, Draft-Mihaly-Enablers-For-TLP-Evolution-00.txt.

Hildebrand, J., et al., "Substrate Protocol for User Datagrams (SPUD) Prototype," Network Working Group, Internet-Draft, Internet Engineering Task Force (IETF), Mar. 9, 2015, pp. 1-14, draft-hildebrand-spud-prototype-03.

Friedl, S., et al., "Transport Layer Security (TLS) Application-Layer Protocol Negotiation Extension," Internet Engineering Task Force (IETF), Request for Comments: 7301, ISSN: 2070-1721, Standards Track, Jul. 1, 2014, pp. 1-9.

Information Sciences Institute, "Transmission Control Protocol," DARPA Internet Program, Protocol Specification, Sep. 1, 1981, RFC:793, prepared for Defense Advanced Research Projects Agency, pp. 1-90.

Touch, J., "Transport Options for UDP," TSGWG, Internet Draft, Intended status: Experimental, Jul. 21, 2015, Internet Engineering Task Force (IETF), pp. 1-8, draft-touch-tsvwg-udp-options-01.txt.

Bormann, C., et al., "Concise Binary Object Representation (CBOR)," Internet Engineering Task Force (IETF), Request for Comments: 7049, Category: Standards Track, ISSN: 2070-1721, Oct. 1, 2013, pp. 1-54.

Hamilton, R., et al., "QUIC: A UDP-Based Secure and Reliable Transport for HTTP/2," Network Working Group, Internet-Draft, Jul. 8, 2015, Internet Engineering Task Force (IETF), draft-tsvwg-quic-protocol-01, pp. 1-31.

Briscoe, B., "Extended TCP Option Space in the Payload of an Alternative SYN," TCP Maintenance and Minor Extensions (tcpm), (56) References Cited

OTHER PUBLICATIONS

Internet-Draft, Oct. 27, 2014, Internet Engineering Task Force (IETF), pp. 1-2, draft-briscoe-tcpm-syn-op-sis-03.
Trammell, B., "Substrate Protocol for User Datagrams (SPUD)," IETF 92 Dallas, Mar. 25, 2015, Dallas, TX, pp. 1-14.

* cited by examiner

| Offsets | | Octet | 0 | | | | | | | | 1 | | | | | | | | 2 | | | | | | | | 3 | | | | | | |
|---|---|---|---|---|---|---|---|---|---|---|---|---|---|---|---|---|---|---|---|---|---|---|---|---|---|---|---|---|---|---|---|---|
| Octet | Bit | | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 0 | 0 | | \multicolumn{32}{l}{magic = 0xd80000d8} |
| 4 | 32 | | \multicolumn{32}{l}{tube id} |
| 8 | 64 | | | | | | | | | | | | | | | | | | | | | | | | | | | | | | | | | |
| 12 | 96 | | cmd | | | | | | add\_exec | resv | | | | | | | | | CBOR map 30 ... | | | | | | | | | | Data structure 300, 301 | | | | |

MEM 20012; 20022

Data structure 300

```
{ 0 : [TCP SYN (byte string)]
  1 : [CUSTOM protocol setup msg (byte string)]
  2 : [QUIC setup message (byte string)]
  "procedure ID" : "AF0096C3"
  "version" : "0"
  "prot0" : "tcp"
  "prot1" : "se.ericcson.amazingprotocol"
  "prot2" : "quic/28"
  "preference" : { 1, 2, 0}
  "jitter" : "low"
  "app" : "RT video"
  ...
}
```

MEM 20012; 20022

Fig. 4C

Data structure 300

{ .... #(client setup messages as before)

"com procedure ID" : "4056AC" # identification of the
                               #communication procedure used "MB1 ID" : "hu.operator1" # identification of the network "MB1 preference" : { 1, 2, 0} # network preference on the TPs

"MB1 nw state" : "cong2" # information about the state of the network "MB1 prot2 InitCWND" : "100" # network suggested InitCWND value "MB1 sig" : "00ABC"   # authentication

...
}

MEM 20012; 20022

TECHNIQUE FOR TRANSPORT PROTOCOL SELECTION AND SETUP OF A CONNECTION BETWEEN A CLIENT AND A SERVER

TECHNICAL FIELD

The present disclosure generally relates to for transport protocol selection and setup of a connection between a client and a server. The technique of the present disclosure may be embodied in methods, apparatuses and data structures.

BACKGROUND

Transport Protocols (TP) continuously evolve as a result of new requirements emerging from the evolution on the application and service layer. One problem with the innovation in this area is that TPs are currently implemented in the kernel of an operating system. However, kernel updates are generally slow.

In addition, the proprietary TP implementations—that would require modifications of existing TPs in the clients—are therefore not usable. Each new modification needs to undergo a long standardization process, followed by a period until its deployment in the operating systems. However, this process may take years.

A possible solution to such problem, which is also observed today in some of the new TP designs (such as Quick User Datagram Protocol (UDP) Internet Connections (QUIC)—a TP for HyperText Transfer Protocol 2 (HTTP2), and Web Real Time Communication (WebRTC)—a protocol for real-time communication in web browsers), resides in an implementation in the application space on top of UDP instead of the kernel. This is a possible way to speed up the innovation on the TP layer in the current eco-systems. If there are more TPs available for a given communication, the endpoints need to discover and negotiate which overlying transports are available for a given interaction.

A fast TP setup time is important for certain applications. This is why, for example, QUIC provides means for fast (i.e., 0 up to 1 Roundtrip Time (RTT)) setup times. However, the first setup in QUIC requires (at least) 1 RTT because of security context establishment, while the re-establishment of the connection with the same server is made available considerably faster by a unique Connection ID (CID) that the client receives during the previously established connection.

Here, it must be noted that the main target for the TP selection is that it should be possible to select and set up the most preferred TP that is available to both ends in 1 RTT (including the case with the first ever TP setup and security context establishment), when the selected TP allows for doing so. Currently suggested approaches exhibit various weaknesses in this respect. Certain approaches require information exchange before the TP establishment may take place, which implies at least 1 additional RTT compared to the TP setup time. The problem with other approaches is a certain processing overhead due to unnecessary multiple protocol setup.

SUMMARY

Accordingly, there is a need for an implementation of a scheme that avoids one or more of the problems discussed above, or other related problems, in connection with TP selection and setup.

In a first aspect, there is provided a method for influencing TP selection and setup of a connection between a client and a server, the method being performed in a middlebox located between the client and the server and comprising the steps of receiving a session setup message comprising: i) setup information for at least one candidate TP, and ii) a preference order for setup of the at least one TP; and processing the received session setup message by extending the same with information or removing information from the same so as to influence subsequent TP selection at the server.

In some variants, the middlebox may thus influence the TP selection to have the server decide on a balance between the user's (client's) demands and the network's demands.

In a first refinement of the first aspect, the method may further comprise intercepting, in response to the received and processed session setup message, a setup response message comprising the setup information pertaining exclusively to one TP selected for the connection. In addition or alternatively, the method may further comprise parsing, prior to the processing, the received session setup message so as to identify at least one of the setup information for at least one candidate TP and the preference order, and forwarding, after the processing, the processed session setup message to the server. In addition or alternatively, the method may further comprise identifying, from the intercepted setup response message, at least one of the selected TP and its setup information. In this way, the middlebox has means to investigate compliance/non-compliance with, for example, an alteration made to the previous session setup message.

In a second aspect, there is provided a method for TP selection and setup of a connection between a client and a server, the method being performed in the server and comprising the steps of receiving a session setup message comprising i) setup information for at least one candidate TP, and ii) a preference order for setup of the at least one TP; selecting, depending on availability of the candidate TPs, the most preferred TP on the basis of the preference order; and transmitting, in response to the received session setup message, a setup response message comprising the setup information pertaining exclusively to one TP selected for the connection.

In certain variants, the server can thus leverage between the client's preferences and the conditions on side of the network.

In a first refinement of the second aspect, the method may further comprise the steps of processing the received session setup message so as to identify the type of message; if the message type indicates that the setup information for at least one candidate TP and the preference order are to be used, performing parsing the setup information for at least one candidate TP so as to find TP options to select from; the selecting step; and creating the setup response message comprising the setup information pertaining exclusively to one TP selected for the connection. In this case, the method may further comprise the step of creating a state of the selected TP. Accordingly, the proposed implementation is also backwards-compatible by allowing legacy devices to ignore the setup information and preference order.

In a third aspect, there is provided a method for TP selection and setup of a connection between a client and a server, the method being performed in the client and comprising the steps of preparing a session setup message comprising i) setup information for at least one candidate TP, and ii) a preference order for setup of the at least one TP; transmitting the prepared session setup message towards the server; and receiving, in response to the transmitted session setup message, a setup response message comprising setup information pertaining exclusively to one TP selected for the connection.

In certain variants, a compromise can thus be found between the client's preferences and the conditions on side of the network.

In a first refinement of the third aspect, the method may further comprise, prior to the preparing step, the steps of selecting the at least one candidate TP to use for the connection; and creating a state per each of the at least one candidate TP. If so, the method may further comprise the step of analyzing the received setup response message so as to remove the respective state of each non-selected TP. In that case, the client is already prepared for any selected TP so as to save on time for connection establishment.

In a first refinement of the first to third aspects, the session setup message may further comprise iii) a procedure identifier identifying the type of message. In addition or alternatively, the session setup message may be accommodated in a Concise Binary Object Representation, CBOR, map comprised in a Substrate Protocol for User Datagrams, SPUD, packet, and the setup information for at least one candidate TP and the preference order may be extensions to the CBOR map. Further in addition or alternatively, the setup response message may be accommodated in a Concise Binary Object Representation, CBOR, map comprised in a Substrate Protocol for User Datagrams, SPUD, packet, and the setup information pertaining exclusively to one selected TP may be an extension to the CBOR map. In this way, the proposed solution can in certain variants be implemented exploiting given system resources/messages and involving few to no changes in the system architecture.

In a fourth aspect, there is provided a computer program product comprising program code portions for performing the first to third aspects when the computer program product is executed on one or more computing devices. The computer program product may be stored on a computer readable recording medium.

In a fifth aspect, there is provided a middlebox for influencing controlling TP selection and setup of a connection between a client and a server, the middlebox comprising a module configured to receive a session setup message comprising i) setup information for at least one candidate TP, and ii) a preference order for setup of the at least one TP; and a module configured to process the received session setup message by extending the same with information or removing information from the same so as to influence subsequent TP selection at the server.

In a sixth aspect, there is provided a server for TP selection and setup of a connection between a client and the server, the server comprising a module configured to receive a session setup message comprising i) setup information for at least one candidate TP, and ii) a preference order for setup of the at least one TP; a module configured to select, depending on availability of the candidate TPs, the most preferred TP on the basis of the preference order; and a module configured to transmit, in response to the received session setup message, a setup response message comprising the setup information pertaining exclusively to one TP selected for the connection.

In a seventh aspect, there is provided a client for TP selection and setup of a connection between the client and a server, the client comprising a module configured to prepare a session setup message comprising i) setup information for at least one candidate TP, and ii) a preference order for setup of the at least one TP; a module configured to transmit the prepared session setup message towards the server; and a module configured to receive, in response to the transmitted session setup message, a setup response message comprising setup information pertaining exclusively to one TP selected for the connection.

In an eighth aspect, there is provided a system comprising the client of the seventh aspect and the server of the sixth aspect. The system may further comprise the middlebox of the fifth aspect.

Still further, it is to be noted that the method aspects may also be embodied on the apparatus of the fifth to seventh aspects comprising at least one processor and/or appropriate means for carrying out any one of the method steps. Accordingly, the apparatus aspects may attain the same or similar advantages as the method aspects.

In a ninth aspect, there is provided a data structure for TP selection and setup of a connection between a client and a server, the data structure comprising i) setup information for at least one candidate TP, and ii) a preference order for setup of the at least one TP. The data structure may be accommodated in a Concise Binary Object Representation, CBOR, map comprised in a Substrate Protocol for User Datagrams, SPUD, packet, and the setup information for at least one candidate TP and the preference order may be extensions to the CBOR map. Further, the data structure may further comprise iii) a procedure identifier identifying the type of message.

In a tenth aspect, there is provided a data structure for TP setup of a connection between a client and a server, the data structure comprising setup information pertaining exclusively to one TP selected for the connection. The data structure may be accommodated in a Concise Binary Object Representation, CBOR, map comprised in a Substrate Protocol for User Datagrams, SPUD, packet, and the setup information pertaining exclusively to one selected TP may be an extension to the CBOR map.

BRIEF DESCRIPTION OF THE DRAWINGS

The embodiments of the technique presented herein are described herein below with reference to the accompanying drawings, in which.

DETAILED DESCRIPTION

In the following description, for purposes of explanation and not limitation, specific details are set forth (such as particular signalling steps) in order to provide a thorough understanding of the technique presented herein. It will be apparent to one skilled in the art that the present technique may be practiced in other embodiments that depart from these specific details. For example, the embodiments will primarily be described in the context of $3^{rd}$ generation (3G) or $4^{th}$ generation/long term evolution (4G/LTE); however, this does not rule out the use of the present technique in connection with (future) technologies consistent with 3G or 4G/LTE, be it a wire-bound communications network or a wireless communications network. In addition, the present disclosure may also be implemented, if applicable in a working form, in legacy devices.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a field programmable gate array (FPGA) or general purpose computer. It will also be appreciated that while the following embodiments are described in the context of methods and devices, the technique presented herein may also be embodied in a computer program product as well as in a system comprising a computer processor and a memory coupled to the processor, wherein the memory is encoded with one or more programs that execute the services, functions and steps disclosed herein.

Figure 1A:
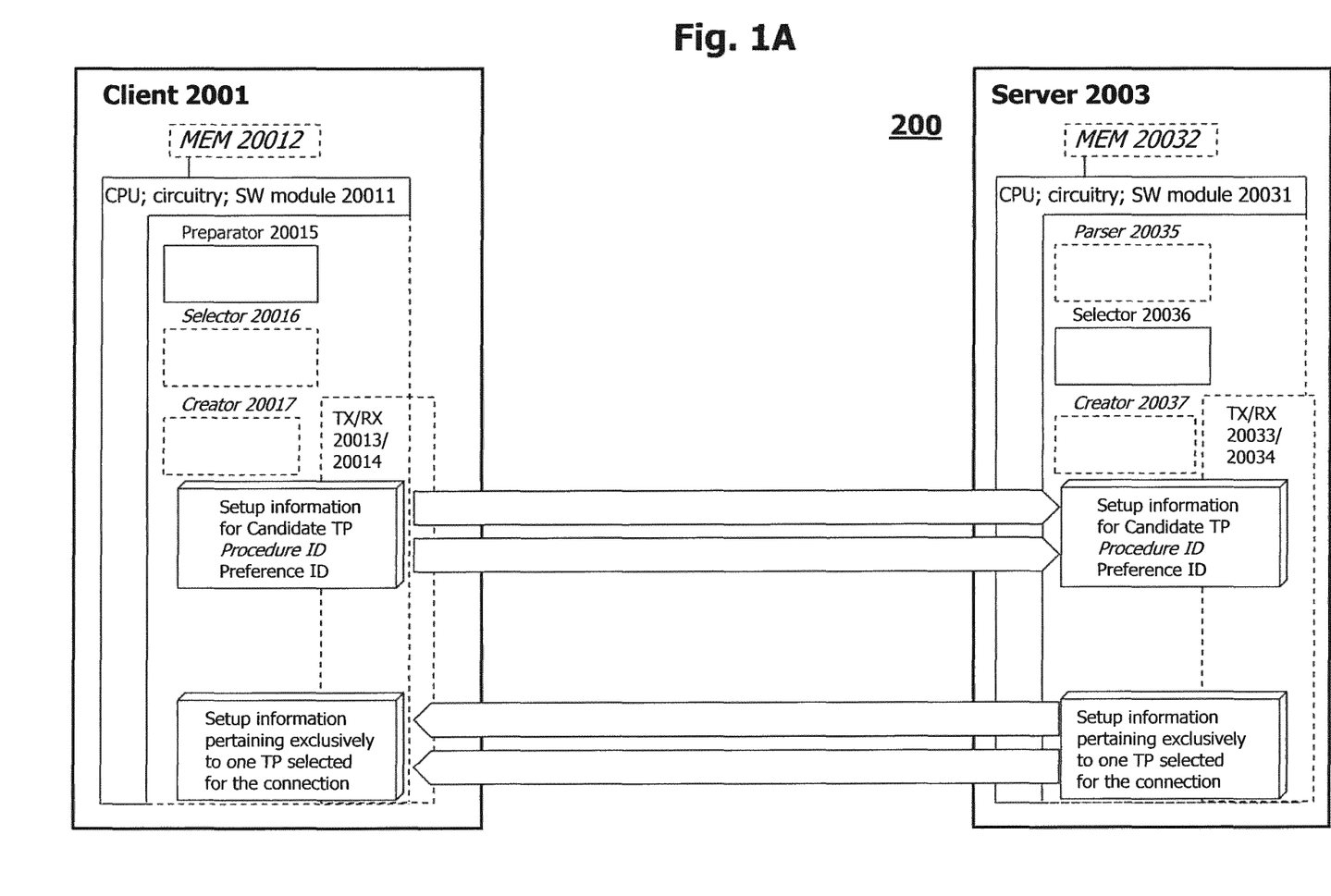
FIG. 1A shows components comprised in a first device embodiment realized in the form of an apparatus.

FIG. 1A shows components comprised in a first exemplary device embodiment realized in the form of a client 2001 and a server 2003.

As shown in FIG. 1A, the client 2001 comprises a core functionality (e.g., one or more of a Central Processing Unit (CPU), dedicated circuitry and/or a software module) 20011, an optional memory (and/or database) 20012, a transmitter 20013 and a receiver 20014. Moreover, the client 2001 comprises a preparator 20015, an optional selector 20016 and an optional creator 20017.

Further, the server 2003 comprises a core functionality (e.g., one or more of a Central Processing Unit (CPU), dedicated circuitry and/or a software module) 20031, an optional memory (and/or database) 20032, a transmitter 20033 and a receiver 20034. Moreover, the server 2003 comprises an optional parser 20035, a selector 20036 and an optional creator 20037.

Figure 1B:
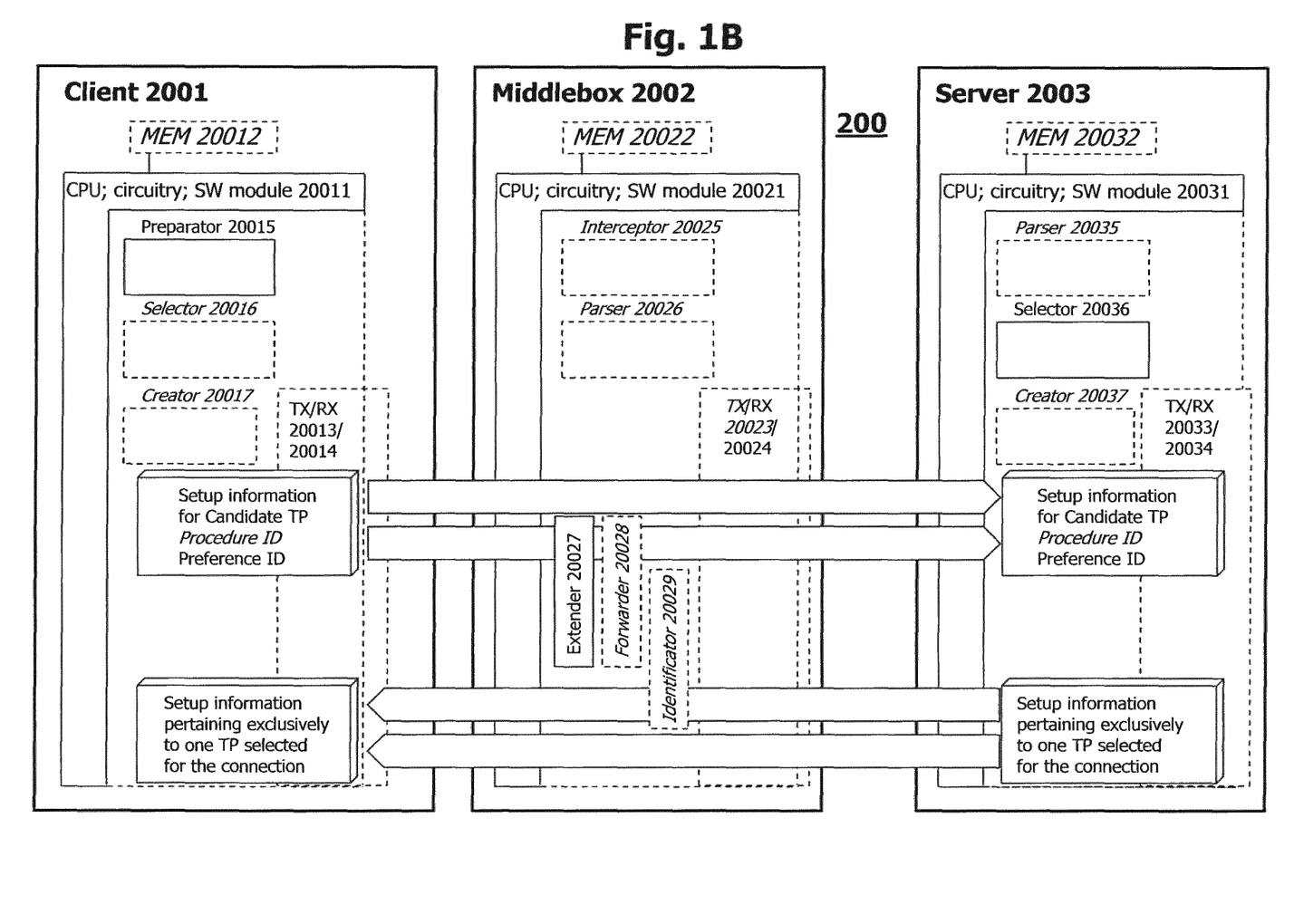
FIG. 1B shows components comprised in a second device embodiment realized in the form of an apparatus.

FIG. 1B shows components comprised in a second exemplary device embodiment realized in the form of the client 2001, a middlebox 2002 and the server 2003. It is noted that in the following, the first and second embodiments will be described basically with reference to the first embodiment (i.e., the system 200 not comprising the middlebox 2002). However, the second embodiment (i.e., the system 200 not comprising the middlebox 2002) basically shows the same functionality, as the middlebox 2002 may be interposed in-between the client 2001 and the server 2003 basically without the client 2001 and/or the server 2003 knowing of the existence of the middlebox 2002.

Accordingly, the middlebox 2002 comprises a core functionality (e.g., one or more of a Central Processing Unit (CPU), dedicated circuitry and/or a software module) 20021, an optional memory (and/or database) 20022, a transmitter 20023 and a receiver 20024. Moreover, the middlebox 2002 comprises an optional interceptor 20025, an optional parser 20026, an extender 20027, an optional forwarder 20028 and an optional Identificator 20029.

In the following, the parameter "x" may assume the values 1, 2 and 3 for designating the client 2001, the middlebox 2002 and the server 2003, respectively. For instance, the syntax "200x1" refers to the CPU 20011 of the client 2001, the CPU 20021 of the middlebox 20021 and/or the CPU 20031 of the server 2003, respectively.

As partly indicated by the dashed extensions of the functional blocks of the CPUs 200x1, the preparator 20015, the selector 20016 and the creator 20017 (of the client 2001), the interceptor 20025, the parser 20026, the extender 20027, the forwarder 20028 and the identificator 20029 (of the middlebox 2002) and the parser 20035, the selector 20036 and the creator 20037 (of the server 2003) as well as the respective memories 200x2, the respective transmitters 200x3 and the respective receivers 200x4 may at least partially be functionalities running on the CPUs 200x1, or may alternatively be separate functional entities or means controlled by the CPUs 200x1 and supplying the same with information. The transmitter and receiver components 200x3, 200x4 may be realized to comprise suitable interfaces and/or suitable signal generation and evaluation functions.

The CPUs 200x1 may be configured, for example, using software residing in the memories 200x2, to process various data inputs and to control the functions of the memories 200x2, the transmitters 200x3 and the receivers 200x4 (as well as of the preparator 20015, the selector 20016 and the creator 20017 (of the client 2001), the interceptor 20025, the parser 20026, the extender 20027, the forwarder 20028 and the identificator 20029 (of the middlebox 2002) and the parser 20035, the selector 20036 and the creator 20037 (of the server 2003)). The memories 200x2 may serve for storing program code for carrying out the methods according to the aspects disclosed herein, when executed by the CPU 200x1.

It is to be noted that the transmitters 200x3 and the receivers 200x4 may be provided as respective integral transceivers, as is indicated in FIGS. 1A and 1B. It is further to be noted that the transmitters/receivers 200x3, 200x4 may be implemented as physical transmitters/receivers for transceiving via an air interface or a wired connection, as routing/forwarding entities/interfaces between network elements, as functionalities for writing/reading information into/from a given memory area or as any suitable combination of the above. At least one of the preparator 20015, the selector 20016 and the creator 20017 (of the client 2001), the interceptor 20025, the parser 20026, the extender 20027, the forwarder 20028 and the identificator 20029 (of the middlebox 2002) and the parser 20035, the selector 20036 and the creator 20037 (of the server 2003), or the respective functionalities, may also be implemented as a chipset, module or subassembly.

FIGS. 2A, 2B, 3A and 3B show the first and second method embodiments which also reflect the interaction between the components of the first and second device embodiments. In the signalling diagram of FIGS. 2A, 2B, 3A and 3B, time aspects between signalling are reflected in the vertical arrangement of the signalling sequence as well as in the sequence numbers. It is to be noted that the time aspects indicated in FIGS. 2A, 2B, 3A and 3B do not necessarily restrict any one of the method steps shown to the step sequence outlined in FIGS. 2A, 2B, 3A and 3B. This applies in particular to method steps that are functionally disjunctive with each other.

Figure 2A:
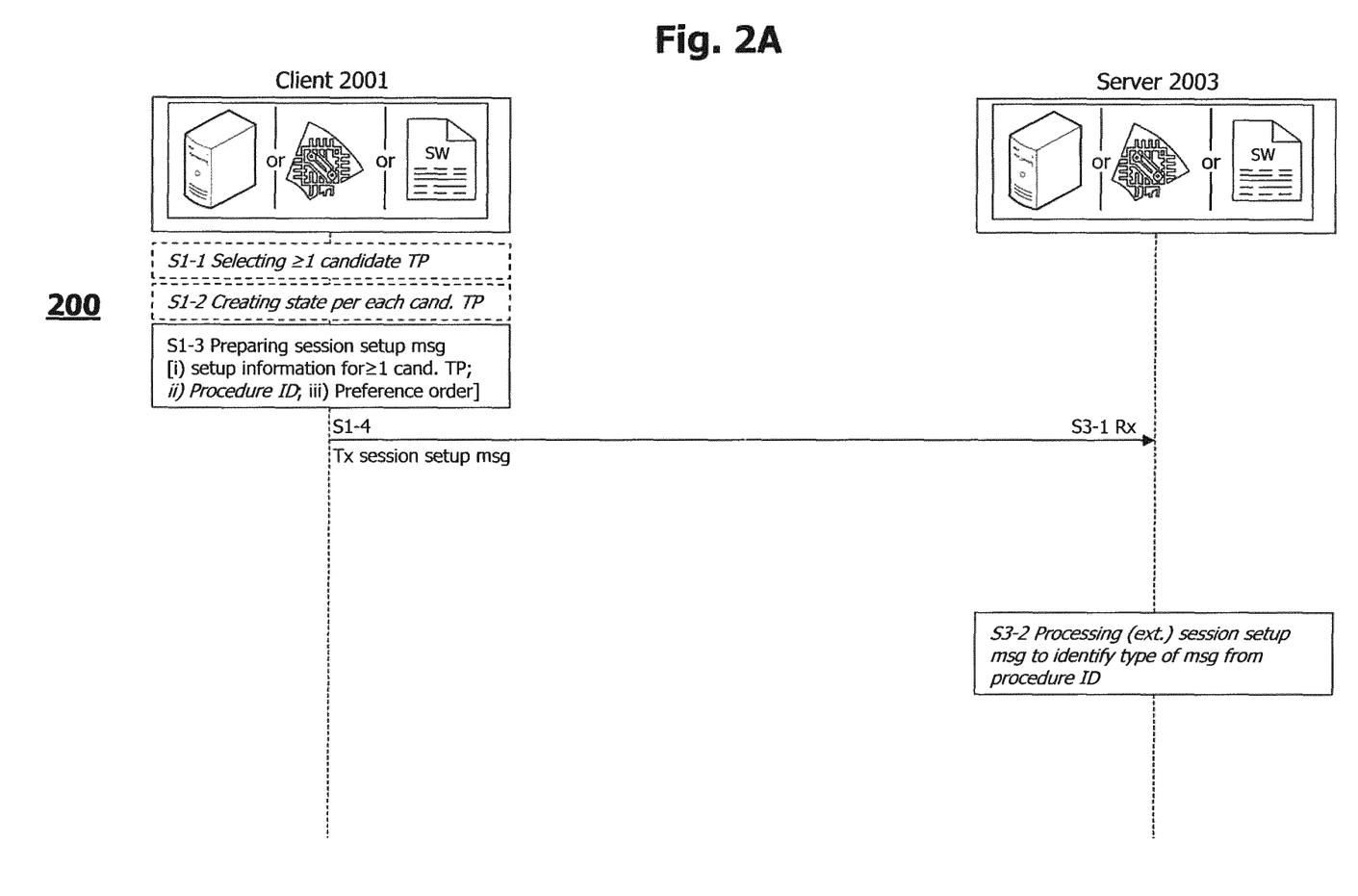
FIG. 2A shows a first method embodiment which also reflects the interaction between the components of the first apparatus embodiment.
Figure 2B:
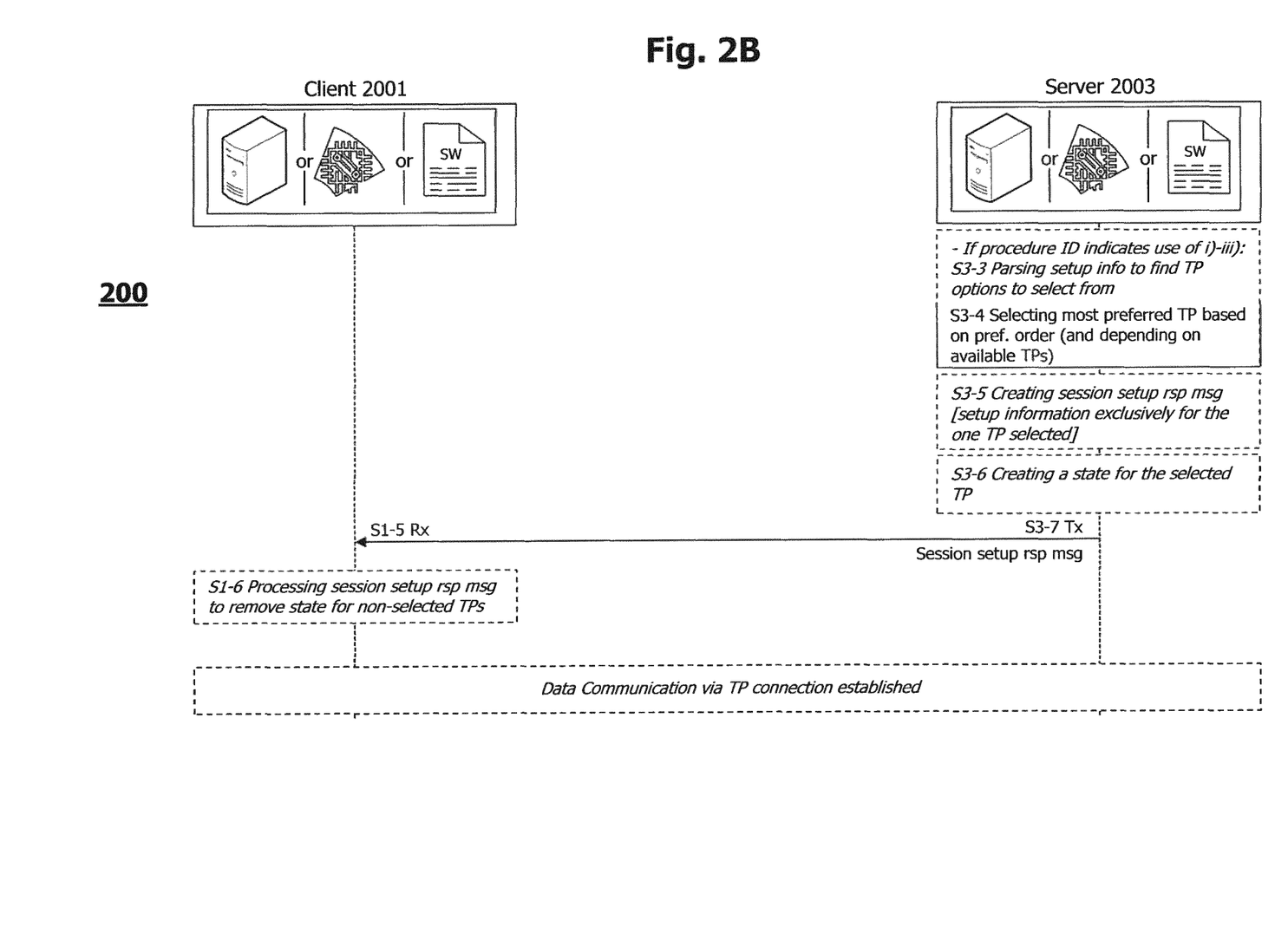
FIG. 2B continues the first method embodiment.
Figure 3A:
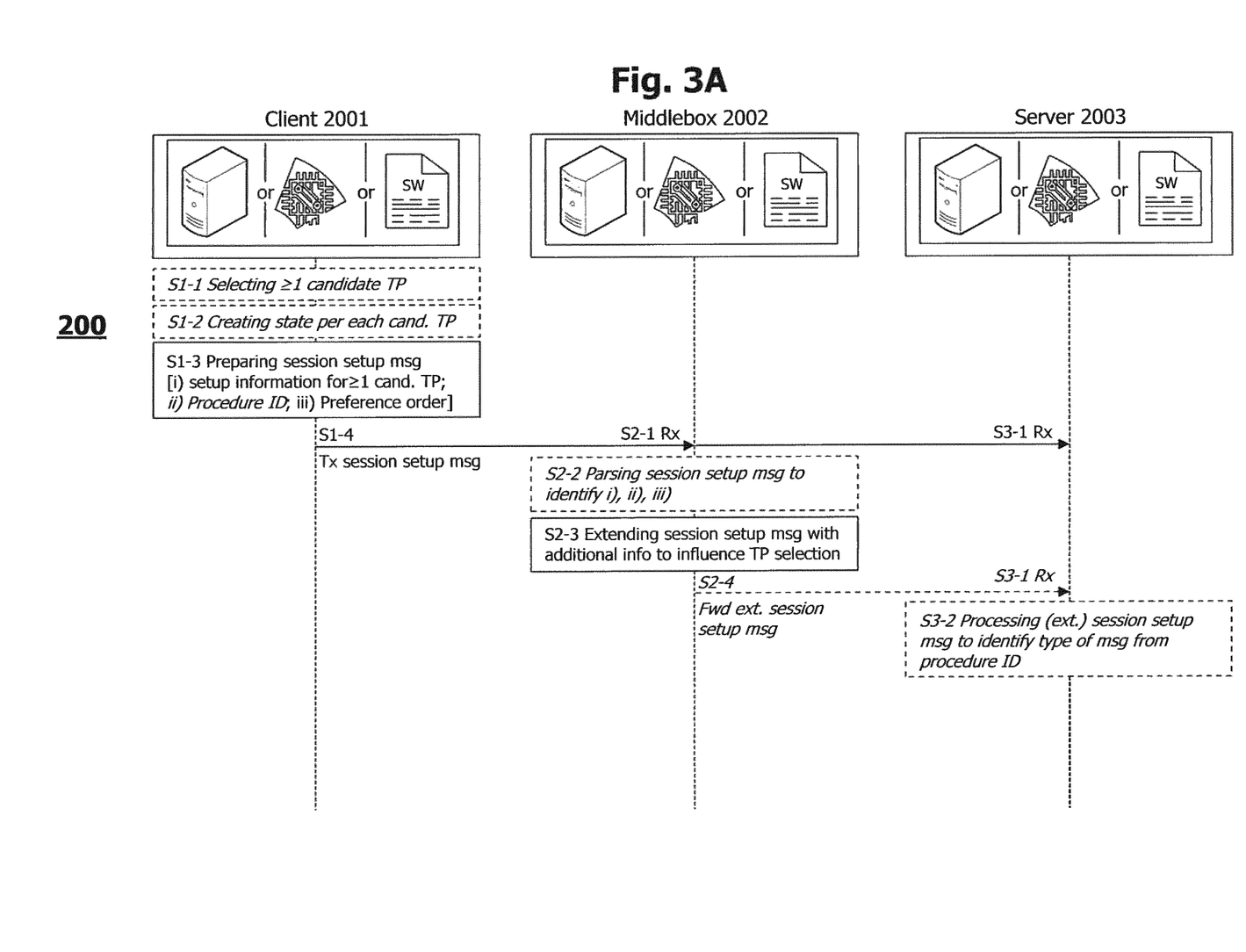
FIG. 3A shows a second method embodiment which also reflects the interaction between the components of the second apparatus embodiment.
Figure 3B:
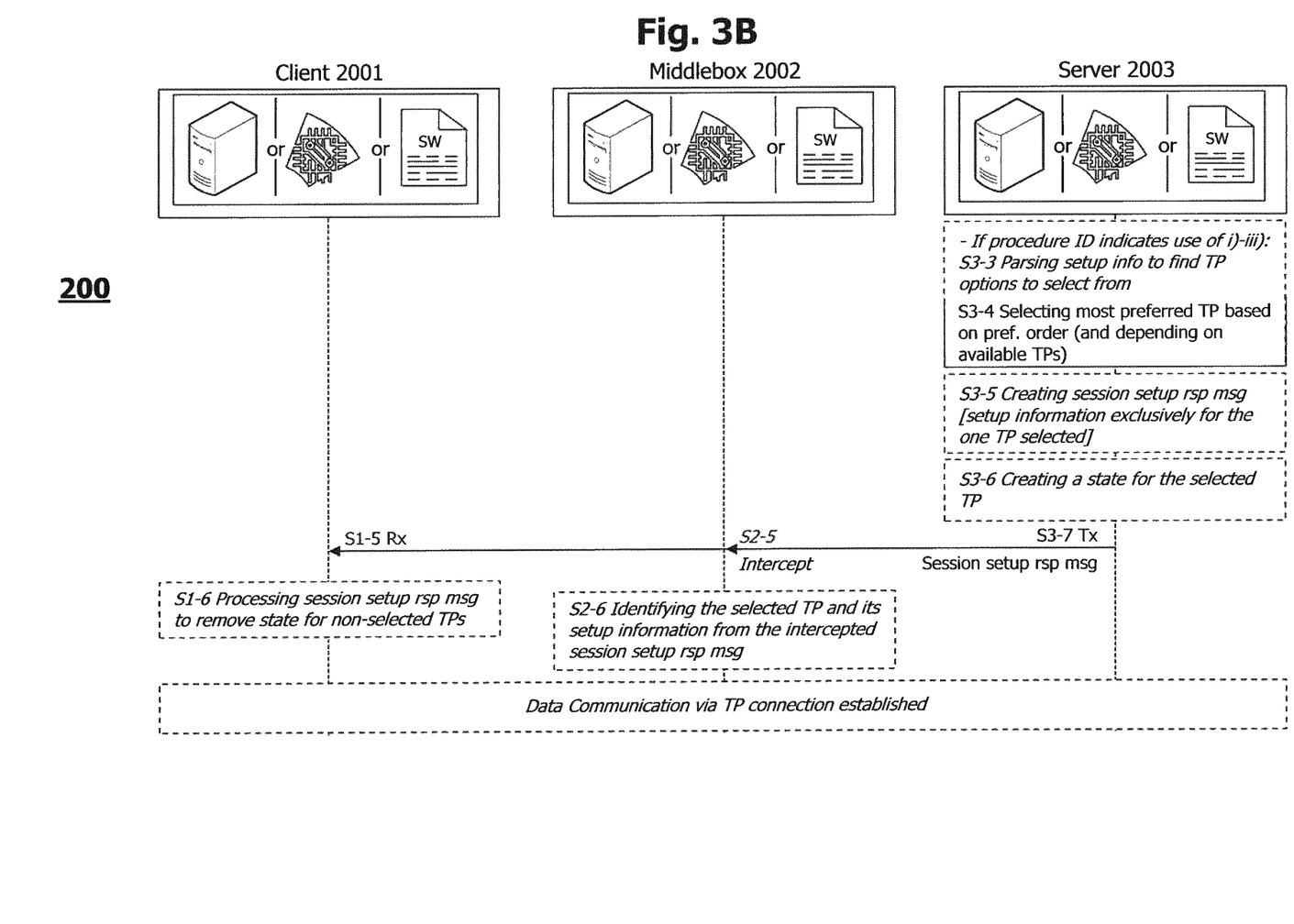
FIG. 3B continues the second method embodiment.

In a first optional preparatory step S1-1, the selector 20016 of the client 2001 performs selecting at least one candidate TP to use for the connection. In a further preparatory step S1-2, the creator 20017 of the client 2001 performs creating a state per each of the at least one candidate TP.

Then, in step S1-3, the preparator 20015 of the client 2001 performs preparing a session setup message 300 (see FIGS. 4B and 4C for details) comprising i) setup information for at least one candidate TP, and ii) a preference order for setup of the at least one TP.

Accordingly, in step S1-4, the transmitter 20013 of the client 2001 performs transmitting the prepared session setup message towards the server 2003. In turn, in step S3-1, the receiver 20024 of the server 2003 receives the session setup message. Here, it must be noted that the session setup message received by the server may be the unmodified session setup message sent directly from the client 2001 (as shown by the upper arrow S3-1 Rx) or may be the modified session setup message from the middlebox 2002 (as shown by the lower arrow S3-1 Rx). It is also possible for the server 2003 to receive both the original and the modified session setup message e.g. in order to recognize the amendments effected by the middlebox 2002.

In this regard, as noted above, the client 2001 and the server 2003 are basically unaware of the existence of the middlebox 2002. Accordingly, reception (and evaluation) of both the original and the modified session setup message would aid to counter possible man-in-the-middle attacks. The implementation of this scheme presupposes a benign middlebox 2002 that does not impede forwarding of the message; detection of a malign middlebox may, e.g., require hashing, as will be described herein below. In addition or alternatively, the middlebox 2002 may be a trusted entity.

Further, according to the second embodiment, the receiver 20023 of the middlebox 2002 performs receiving the session setup message 300 comprising i) the setup information for at least one candidate TP, and ii) the preference order. In an optional step S2-2, the parser 20026 of the middlebox performs parsing, prior to the processing step, the received session setup message so as to identify at least one of the setup information for at least one candidate TP, and the preference order.

Accordingly, in step 2-3, the processor 20021 of the middlebox 2002 performs processing the received session setup message by extending the same with information or removing information from the same so as to influence subsequent TP selection at the server. In this regard, concerning the above-mentioned man-in-the-middle attack, the middlebox may only be allowed extend the original information in the session setup message, but not to alter the information. In addition or alternatively, the client 2001 and the server 2003 may have agreed on a key to use earlier, and the session setup message may in addition comprise e.g. a hash value using the agreed key so as to allow the server 2003 to detect any changes made to the session setup message (i.e., to ensure authenticity/integrity of the session setup message).

It is also possible that e.g. the middlebox 2002 and the server 2003 have agreed on a key to use earlier, and the middlebox 2002 adds a hash value of the entire modified session setup message and/or a hash value of the modified portion of the session setup message. Of course, the above-discussed hash values from the middlebox 2002 and/or the client 2003 may also be used in combination.

Note that in this context, also more than one middlebox 2002 may be interposed between the client 2001 and the server 2003. Also in that case, it would be possible that each middlebox has agreed on an own key with the server 2003, so that the server 2003 can distinguish between alterations from known (benign) middleboxes and from unknown (possibly malign) middleboxes.

In the very end, in an optional step S2-4, the forwarder 20028 of the middlebox 2002 performs forwarding, after the processing, the processed session setup message to the server 2003.

Then, the receiver 20034 of the server 2003 performs receiving of the session setup message 300 comprising i) the setup information for at least one candidate TP, and ii) the preference order for setup of the at least one TP. As noted above, the server 2003 may as well receive one or both of the original and modified session setup message.

Further, in an optional step S3-2, the processor 20031 of the server 2003 performs processing the received session setup message so as to identify the type of message. If the message type indicates that the setup information for at least one candidate TP and the preference order are to be used, in an optional step S3-3, the parser 20035 of the server 2003 performs parsing the setup information for at least one candidate TP so as to find TP options to select from.

Then, in step S3-4, the selector 20036 of the server 2003 performs selecting, depending on availability of the candidate TPs, the most preferred TP on the basis of the preference order. Optionally, the selecting step S3-4 may also be conditional on the outcome of step S3-2, i.e. whether the message type indicates that the setup information for at least one candidate TP and the preference order are to be used; however, this does not preclude also an unconditional performance of the selecting step S3-4.

Further, in an optional step S3-5, the creator 20037 of the server 2003 performs creating a setup response message 301 (see FIGS. 4D and 4E for details) comprising the setup information pertaining exclusively to one TP selected for the connection.

In an optional step S3-6, the creator 20037 of the server 2003 performs creating a state of the selected TP. This optional step S3-6 would interwork with the above described optional step S1-2 performed at the client.

Finally, in step S3-7, the transmitter 20033 of the client 2003 performs transmitting, in response to the received session setup message, the setup response message 301 comprising the setup information pertaining exclusively to one TP selected for the connection.

Accordingly, in the second embodiment, in an optional step S2-5, the interceptor 20025 of the middlebox 2002 performs intercepting, in response to the received and processed session setup message, the setup response message 301 comprising the setup information pertaining exclusively to one TP selected for the connection. Accordingly, in an optional step S2-6, the identificator 20029 of the middlebox 2002 performs identifying, from the intercepted setup response message, at least one of the selected TP and its setup information.

Still further, in both the first and second embodiments, the receiver 20014 of the client performs receiving, in response to the transmitted session setup message, the setup response message 301 comprising setup information pertaining exclusively to one TP selected for the connection. Finally, in an optional step S1-6, the processor 20011 of the client performs processing the received setup response message so as to remove the respective state of each non-selected TP.

As mentioned above, FIG. 4A shows a possible container (such as a Substrate Protocol for User Datagrams (SPUD) wire format with a CBOR map) for the data structures of the present disclosure.

Especially for the second embodiment discussed above, and in the following, the implementation solution by assuming that both the client 2001 and the server 2003 support a substrate middlebox communication protocol. The usage of SPUD is advantageous in that SPUD is meant to be a communication channel below UDP-based TPs. Note that an alternative communication based one on legacy transport protocol options is also possible.

SPUD is an example for a protocol, which can be easily extended by safe to ignore parts. A possible option resides in including SPUD as a new layer below evolved transport protocols and thus can be utilized for the purpose of the extension proposed in this disclosure.

SPUD has been proposed in IETF for a slightly different purpose, namely as an extensible in-band channel below UDP that allows endpoints to signal traffic meta-data to the middleboxes on the path. SPUD also provides a mechanism for the middleboxes to signal back to the same endpoint using the same in-band channel.

However, SPUD involves number of constraints on the information exposed between the end-points and the middleboxes. The constraints include:

- SPUD is based on declarations only, thus no negotiation is needed between the parties, which reduces the communication latency. There is also no assumption on what action (if any) will follow a given declaration.
- Endpoints/middleboxes may trust, but can also verify the information received.
- Incremental usefulness, no mandatory minimum vocabulary needed, i.e. SPUD needs not be supported by all nodes on a path before a benefit is seen. All parties must ignore (and not delete) content not understood. The sender must also assume it may not be understood. This facilitates incremental deployment.

Figure 4A:
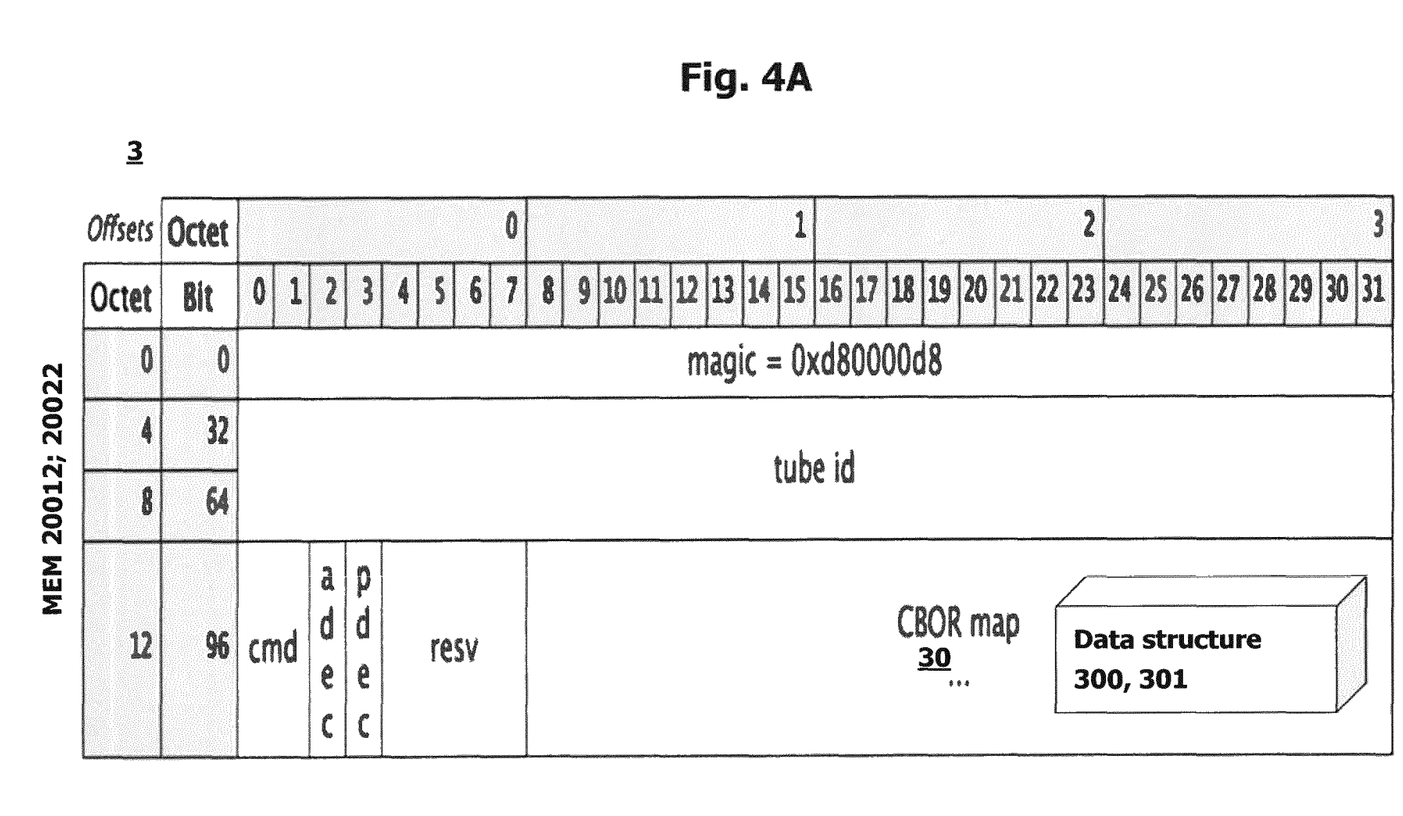
FIG. 4A shows a possible container (such as a Substrate Protocol for User Datagrams (SPUD) wire format with a CBOR map) for the data structures of the present disclosure.

In turn, the structure of the SPUD packet 3 is depicted in FIG. 4A. The so-called magic number is a constant used to avoid collision with valid packet content at the same offsets for a variety of known UDP-based protocols. The tube ID identifies the UDP packets grouped together from the sender. The packet also contains two one-bit markings showing whether this packet is an application declaration ("adec") or a path (i.e., middlebox 2002) declaration ("pdec"). The last part of the SPUD packet contains a CBOR map 30.

Figure 4B:
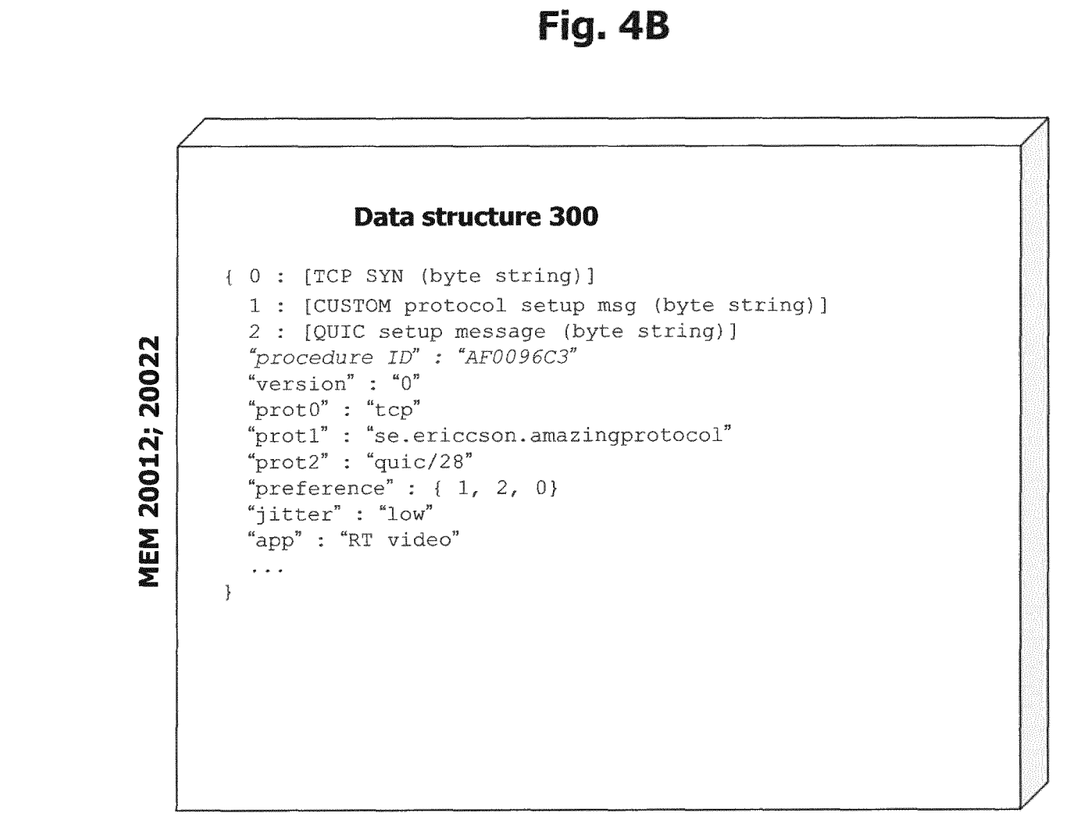
FIG. 4B shows a data structure for a client-side session setup message according to the present disclosure.

FIG. 4B shows a data structure 300 for a client-side session setup message according to the present disclosure.

As an example, the CBOR map 30 consists of key-value pairs of the form {[key 1]:[value 1], . . . , [key n]:[value n]}. The key "0" may be reserved for application data, i.e. the data of the transport protocol to follow.

Figure 4C:
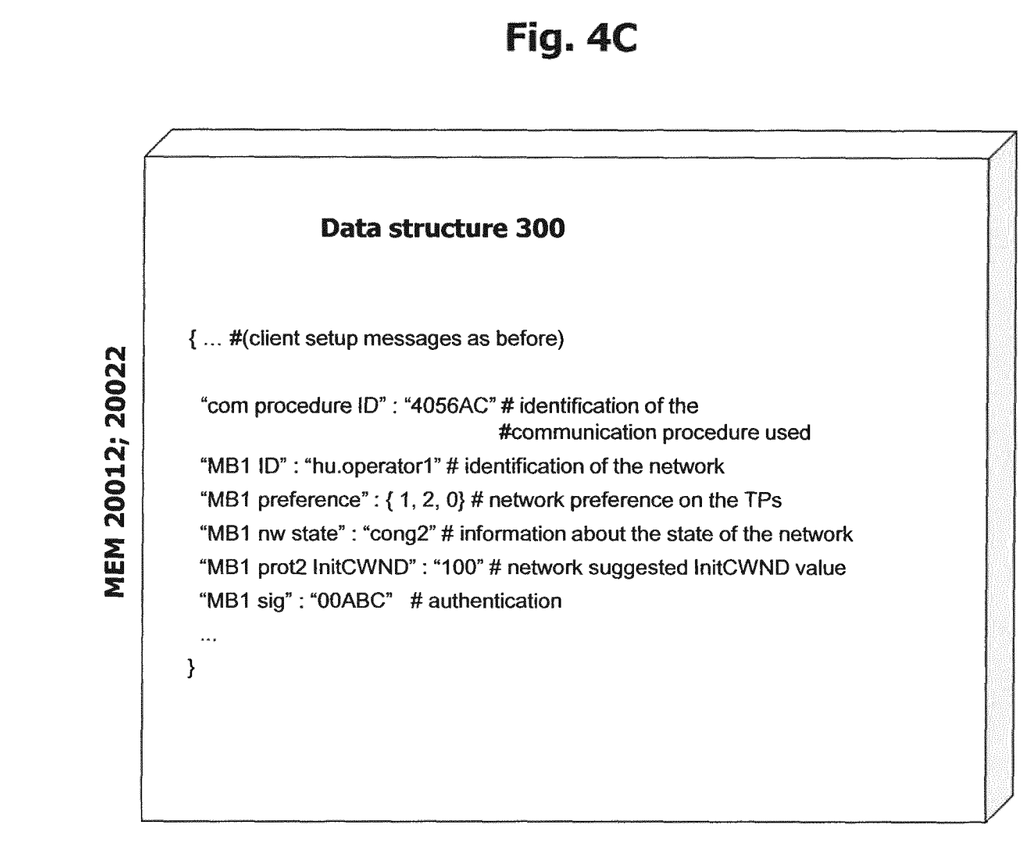
FIG. 4C shows a data structure for a session setup message after insertion of additional information by the middlebox to influence TP and TP parameter selection.

An example session setup message 300 under the assumption of using the SPUD protocol is shown in FIGS. 4B and 4C, with the following information. The so-called 5-tuple and the SPUD tube id identify the connection attempt (note: that information may be comprised in the SPUD header, see FIG. 4A). The legacy protocol in the example (whose SYN setup message is identified by the "0" key) is TCP. There are two more TP setup messages sent by the client, for CUSTOM (key "1") and QUIC (key "2") TPs, respectively. The values for the keys "protx" (i.e., prot0, prot1 and prot2) are identification strings of the different protocols.

In turn, the client 2001 may set the preferences (i.e., the values after the "preference" key) in this example in such a way that CUSTOM is most preferred, then QUIC and then TCP. Note that this is in implementation example of the "setup information for candidate TP" discussed hereinabove.

In turn, the optional "procedure ID" (also discussed above) may a constant hexadecimal value that identifies that the method described in this disclosure is being used.

Optionally, there may also be a "version" value, which can identify the current setup procedure implementation in the client 2001.

Finally, the client 2001 may optionally give additional information about the nature of the stream and the network 200 that is going to be transferred on this connection, and which might be relevant for selecting the right transport protocol, e.g., "app", "jitter" and "network type".

Any information which is not needed for selecting the right protocol is proposed to be communicated using higher layers. Also information, which is already available on the server side, needs not be transmitted for this purpose.

Note that the additional key-value pairs in the setup message represent little or low overhead. For many practical cases, the different setup messages will fit into a single packet. Note that in the case of fast (e.g., 1-RTT) TP setup, in general it is advisable that the sender (client 2001) pads/fills the packet due to the fact that the setup message has to be padded to assure that a full-packet-response can be sent by the server 2003, and that it will typically be no larger than the first packet from the client 2001. This full-packet will also raise the bandwidth cost for any attacker (supplying a false return address), diminishing the potential, if any, for any reflected amplification (so-called "amplification attack").

Thus, in many cases, there is no overhead with applying the present disclosure. If there are numerous TPs to select from, not all setup messages might fit into the same setup packet. In this case, it is advisable to only include the most common and most preferred TPs, while only referring to other TP options. In this case, a non-included TP (its setup message) can still be chosen but it will require an additional RTT for setup.

FIG. 4C shows a data structure 300 for a session setup message after insertion of additional information by the middlebox to influence TP and TP parameter selection. Note that text after #marks are comments related to the given part of the CBOR messages.

As depicted by "client setup messages as before", the data structure in FIG. 4C comprises the entire message depicted in FIG. 4B. In addition, the middlebox 2002 may extend the message with e.g. the network's preference on the TPs to be used. Optionally, as noted above, the data structure 300 in FIG. 4C may also comprise authentication information for authenticating the middlebox 2002 towards the server 2003.

Figure 4D:
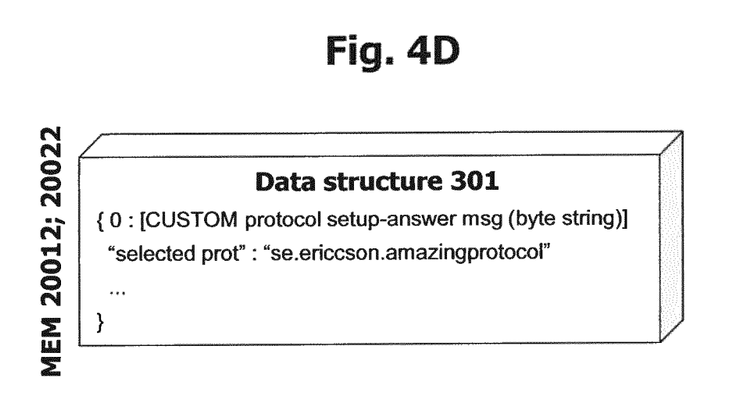
FIG. 4D shows a data structure for the session setup response message comprising the server-side selection of TP.

FIG. 4D shows a data structure 301 for the session setup response message comprising the server-side selection of TP. In turn, FIG. 4E shows a data structure 301 for the session setup response message when the server does not support the TP selection or the server does not support the preferred TPs.

Figure 4E:
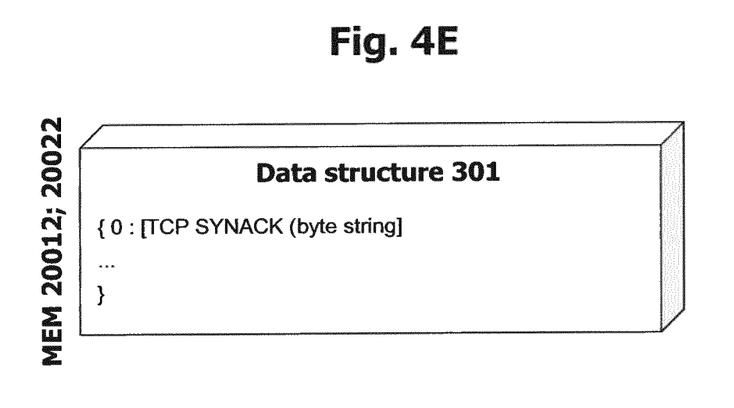
FIG. 4E shows a data structure for the session setup response message when the server does not support the TP selection or the server does not support the preferred TPs.

The data structures 301 shown in FIGS. 4E and 4E are built on the declarative nature of the SPUD information elements, i.e. that it is expected and safe to discard any CBOR key-value pairs, which are not understood e.g. by the server 2003.

There are two ways the server can process the session setup message (it is assumed that the server 2003 implements SPUD):

If the server 2003 does not implement the setup mechanism proposed in this disclosure, then it assumes that a default TP is being used, which may be identified by e.g. UDP port. As an example, it may be TCP as the TP to use and finds the setup (SYN) message either besides the "0" key or in the TCP layer above. The response (SYNACK) may also be reflected in the CBOR map of the SPUD header, as in FIG. 4A.

In the other alternative, the server 2003 may implement the setup method, and thus identifies from the "procedure ID" that this is a message of the solution described in this disclosure. It then parses the "protx" values to find the TP options to select from. It then verifies the availability of the different protocols and selects the most preferred protocol. The SPUD response may then be like the one in FIG. 4D (assuming that the CUSTOM protocol is available). Note that the setup response message may be inserted under key "0"; in addition a string along with the "selected prot" key can help the client 2001 to identify the finally selected TP.

In the foregoing, it had been described how the session setup message may be embedded in a protocol layer below the TP (e.g. using SPUD). This does not preclude that a very similar methodology can be used for other protocols, where there are long enough safe-to-ignore parts in a setup message. That part can be e.g. padding for security reasons to not enable so-called "amplification attacks".

Encrypted SPUD:

It may be that the communication layer below the TP is encrypted (SPUD is originally meant to be a middlebox communication protocol so this is a feasible assumption). In that case, the wire format of the communication may have the following form (assuming Datagram Transport Layer Security (DTLS) for encrypting both the SPUD and the TP layer): IP/UDP/DTLS/SPUD/DTLS/TP.

Since in such case the connection setup should start with a DTLS protocol negotiation, the 1-RTT TP setup may be achieved by an (Application-Layer Protocol Negotiation) ALPN-like mechanism in the DTLS session protecting SPUD.

Encrypted TP

The present disclosure is also applicable when the TP session is to be encrypted. In that case, the session setup and response messages should also contain the required credentials (note that the exchange of credentials may take place during the TP setup). If there are multiple TP options that should be encrypted, then the method may allow sending the required credentials only once, provided a reference is given to the set of TPs that they refer to. Further, this is a general feature that may be applied with this method: parts of the setup messages that are common to the different TPs may be compressed into a single setup message.

In non-restricting use cases, the behaviour of the client 2001, the middlebox 2002 and the server 2003 according to exemplary embodiments may be summarized as follows (this does not preclude that the other embodiments of the present disclosure may use broader and/or narrower terms):

An embodiment for negotiating TP to use for a certain connection between a client 2001 and a server 2003 comprises (parts of the setup messages that are common to the different TPs may be compressed into a single setup message):

Client 2001 prepares a single session setup message including
a. the identification and setup messages of different TPs that could be used for the given communication;
b. the setup message of a widely supported TP, in such a way that it is comprehensive to a server agnostic to the present disclosure; and
c. the relative preference of selecting a given TP.

Server 2003 processes the session setup message, including (the setup messages are embedded in a safe to ignore part of a packet and the default TP setup message is in the regular part):
a. Identification of the different TPs supported by the client
b. Identification of the client preferences
c. Selection of the highest preference TP available, and sending the setup response for this TP together with the identification of the TP to the client Where the safe to ignore part is in a layer below the TP
Where the safe to ignore part is in the CBOR map of SPUD messages/DTLS
Where the safe to ignore part is in a setup message of a widely used TP, by, e.g., using the TP extension headers.

In an embodiment, the setup message prepared by the client 2001 is further extended by middlebox 2002. Specifically, one or more the following informational items can be supplemented:

Authentication information for the network
Network preference order of TPs
Network suggested parameters for certain TPs The embodiments described above could further be extended by an approach that builds on a certain protocol, and which in turn has the possibility to include safe-to-ignore information. This protocol by default is used to set-up a well-known TP (which is identified, e.g., by port numbers). The extension builds on the possibility to include a new procedure in that protocol. Legacy endpoints can safely ignore all additional information provided by this extension. Within the safe-to-ignore part, set-up messages of other transport protocol(s), a transport protocol selection procedure id and preference order of transport protocols can be included. A remote endpoint (e.g., the client 2001 and/or the server 2003) supporting this procedure reads the safe-to-ignore part and selects a transport protocol based on the other party's preferences communicated in the safe to ignore part and based on his own preferences and capabilities. The remote endpoint answers directly using the selected transport protocol. Setup messages of other transport protocols, on the other hand, are discarded. A remote endpoint not supporting this procedure skips the safe to ignore part and sets up the aforementioned well known transport protocol without causing any additional setup delay.

The present disclosure provides numerous advantages. It is generally insensitive to the wire format of different protocols. It provides fast (up to 1-RTT) TP setup (even for encrypted TPs) and can also support proprietary TPs. It is a low overhead solution (since 1-RTT setup anyway requires padding of the setup request to MTU for security reasons) that avoids in certain variants unnecessary protocol state setup in the server. By using a single setup message for the different TPs, load balancing problems in server farms can be avoided. The present disclosure is applicable also when there are different TP 'components' to set up; in this case, common components need to be only specified once. For example, DTLS can be a common component for different TPs using, e.g., end-to-end encryption. Also, it allows the network to influence the TP selection, and TP parameter setting.

It is believed that the advantages of the technique presented herein will be fully understood from the foregoing description, and it will be apparent that various changes may be made in the form, constructions and arrangement of the exemplary aspects thereof without departing from the scope of the disclosure or without sacrificing all of its advantageous effects. Because the technique presented herein can be varied in many ways, it will be recognized that the disclosure should be limited only by the scope of the claims that follow.

The invention claimed is:

1. A method for influencing transport protocol, TP, selection and setup of a connection between a client and a server, the method performed by a middlebox located between the client and the server and comprising:
   receiving a session setup message comprising:
      setup information for at least one candidate TP; and
      a preference order for setup of the at least one candidate TP; and
   processing the received session setup message to influence subsequent TP selection at the server, wherein processing the received session setup message comprises:
      extending the session setup message with information; or
      removing information from the session setup message;
   intercepting a setup response message comprising the setup information pertaining exclusively to one selected TP selected for the connection responsive to processing the received session setup message; and
   wherein the session setup message is accommodated in a Concise Binary Object Representation, CBOR, map comprised in a Substrate Protocol for User Datagrams, SPUD, packet, and wherein the setup information for the at least one candidate TP and the preference order are extensions to the CBOR map.

2. The method of claim 1 further comprising:
   prior to processing the received session setup message, parsing the received session setup message to identify at least one of:
      the setup information for the at least one candidate TP; and
      the preference order for setup of the at least one candidate TP; and
   after processing the received session setup message, forwarding the processed session setup message to the server.

3. The method of claim 1 further comprising identifying at least one of the selected TP and the setup information for the selected TP from the intercepted setup response message.

4. The method of claim 1 wherein the session setup message further comprises a procedure identifier identifying the type of message.

5. The method of claim 1 wherein the setup response message is accommodated in the CBOR map comprised in the SPUD packet, and wherein the setup information pertaining exclusively to the selected TP is an extension to the CBOR map.

6. A middlebox device for influencing transport protocol (TP) selection and setup of a connection between a client and a server, the middlebox comprising:
   communications interface circuitry configured to communicate with a client device and a server device; and
   processing circuitry operatively connected to the communications interface circuitry and configured to:
      receive a session setup message comprising:
         setup information for at least one candidate TP; and
         a preference order for setup of the at least one candidate TP; and
      process the received session setup message to influence subsequent TP selection at the server, wherein to process the received session setup message, the processing circuitry is configured to:
         extend the session setup message with information; or
         remove information from the session setup message;
      intercept a setup response message comprising the setup information pertaining exclusively to one selected TP selected for the connection responsive to processing the received session setup message; and
      wherein the session setup message is accommodated in a Concise Binary Object Representation, CBOR, map comprised in a Substrate Protocol for User Datagrams, SPUD, packet, and wherein the setup information for the at least one candidate TP and the preference order are extensions to the CBOR map.

7. A non-transitory computer readable medium comprising computer instructions thereon that, when executed by a processing circuit of a middlebox device that influences transport protocol (TP) selection and setup of a connection between a client and a server, causes the middlebox to:
   receive a session setup message comprising:
      setup information for at least one candidate TP; and
      a preference order for setup of the at least one candidate TP; and
   process the received session setup message to influence subsequent TP selection at the server, wherein to process the received session setup message, the processing circuitry is configured to:
      extend the session setup message with information; or
      remove information from the session setup message;
   intercept a setup response message comprising the setup information pertaining exclusively to one selected TP selected for the connection responsive to processing the received session setup message; and
   wherein the session setup message is accommodated in a Concise Binary Object Representation, CBOR, map comprised in a Substrate Protocol for User Datagrams, SPUD, packet, and wherein the setup information for the at least one candidate TP and the preference order are extensions to the CBOR map.

\* \* \* \* \*